(12) United States Patent
Yamamura et al.

(10) Patent No.: US 7,072,018 B2
(45) Date of Patent: Jul. 4, 2006

(54) IC SUBSTRATE OF GLASS AND DISPLAY DEVICE

(75) Inventors: Kuni Yamamura, Gifu (JP); Ryoichi Yokoyama, Gifu (JP); Yasushi Miyajima, Gifu (JP); Koji Hirosawa, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/156,972

(22) Filed: May 29, 2002

(65) Prior Publication Data

US 2002/0186341 A1 Dec. 12, 2002

(30) Foreign Application Priority Data

Jun. 8, 2001 (JP) ............................ P.2001-173494

(51) Int. Cl.
*G02F 1/1345* (2006.01)
*G02F 1/1333* (2006.01)

(52) U.S. Cl. ........................ 349/151; 349/149; 349/158

(58) Field of Classification Search ........ 349/149–152, 349/158; 257/59, 72
See application file for complete search history.

(56) References Cited

U.S. PATENT DOCUMENTS

| | | | | |
|---|---|---|---|---|
| 4,649,070 A | * | 3/1987 | Kondo et al. | 428/209 |
| 4,851,363 A | * | 7/1989 | Troxell et al. | 438/151 |
| 5,148,301 A | * | 9/1992 | Sawatsubashi et al. | 349/153 |
| 5,426,526 A | * | 6/1995 | Yamamoto et al. | 349/42 |
| 5,536,950 A | * | 7/1996 | Liu et al. | 257/59 |
| 5,564,592 A | * | 10/1996 | Martin et al. | 220/724 |
| 5,757,456 A | * | 5/1998 | Yamazaki et al. | 349/151 |
| 5,786,242 A | * | 7/1998 | Takemura et al. | 438/166 |
| 5,959,709 A | * | 9/1999 | Asada et al. | 349/150 |
| 5,963,287 A | * | 10/1999 | Asada et al. | 349/150 |
| 6,137,120 A | * | 10/2000 | Shindo et al. | 257/66 |
| 6,163,357 A | * | 12/2000 | Nakamura | 349/155 |
| 2001/0029055 A1 | * | 10/2001 | Ninomiya | 438/30 |

FOREIGN PATENT DOCUMENTS

| JP | 7333645 | 12/1995 |
|---|---|---|
| KR | A-2000-0019767 | 4/2000 |

OTHER PUBLICATIONS

Korean Patent Office Notification for Submission of Opinion, dated Jan. 12, 2005.

* cited by examiner

*Primary Examiner*—Tarifur R. Chowdhury
(74) *Attorney, Agent, or Firm*—Fish & Richardson P.C.

(57) ABSTRACT

Disclosed is an IC chip using a glass substrate capable of being manufactured at a lower cost than the IC chip using from a semiconductor wafer. Further, where the body substrate of a display device is made of glass, the IC chip and the body substrate can have equal coefficients of thermal expansion, thus preventing the IC chips from peeling off and reducing the failure rate. Furthermore, the gate line driving IC applied to a display device can be arranged as an IC chip having a length approximately equal to the display area, therefore, mounting a plurality of IC chips as the gate driving IC is not required, thereby reducing the production cost. Still further, all gate lines can be extended in parallel from the IC chip so that no difference in the delay occurs among the gate lines and the size of frame of display device can reduced.

10 Claims, 4 Drawing Sheets

IC SUBSTRATE OF GLASS AND DISPLAY DEVICE

BACKGROUND OF THE INVENTION

This invention relates to an integrated circuit (IC) chip, and more particularly to an IC chip to be mounted on a glass substrate of a device such as a liquid crystal display (LCD), electroluminescent (EL) display, etc.

In recent years, IC chips are incorporated in not only an information processing device such as a computer, but also various machines such as a television, a household electric appliance, a motor car, etc.

FIG. 6 is a perspective view showing a liquid crystal display (LCD) 100. The LCD 100 forms an display area of the liquid crystal sealed between a first body substrate 2 and a second body substrate 3 which are made of glass. On the first body substrate 2 in the display area, switching elements 5, which are formed of a plurality of pixel electrodes 4 and thin film transistors (TFT), are arranged in a matrix. A common electrode 6 is provided below the second body substrate of the entire surface of the display area. The LCD 100 is a display device in which a voltage is applied between the pixel electrodes 4 and the common electrode 6 to drive the liquid crystal for display. On the periphery of the display area, a plurality of gate line driving ICs 101 and a plurality of signal line driving ICs 8 are arranged. A plurality of gate lines 9 are extended from the gate line driving ICs 101. The gate line driving ICs 101 sequentially select the gate lines 9 to apply gate signals so that the TFTs 5 connected to the gate lines 9 are turned on. A plurality of signal lines 10 are extended from the signal line driving ICs 8. The signal line driving ICs 8 supply a video signal to the pixel electrodes 4 through the TFTs 5 which have been turned on. The gate line driving ICs 101 and signal line driving ICs 8 are IC chips mounted on the body substrate.

Generally, the IC chip is constructed of a plurality of circuit elements each including a semiconductor film, a conductive film, an insulating film, etc. stacked on an IC substrate of semiconductor. In this specification, the substrate constituting the LCD 100 is referred to as a body substrate, whereas the substrate constituting the IC chip is referred to as an IC substrate.

FIG. 7 is a sectional view of a MOS transistor which is an example of the circuit element constituting the IC chip. The MOS transistor is structured as follows. A gate insulating film 122 and element isolation regions 123, which are formed by thermally oxidizing a silicon (Si) substrate 121, are provided on the Si substrate 121. On the gate insulating film 122, a gate electrode 124 is provided. By implanting ions into the Si substrate 121 using the gate electrode 124 as a mask, diffused layers 125a and 125b are formed in the Si substrate 121. A first interlayer insulating film 126 is provided to cover the gate electrode 124. A first wiring 127 is provided through a contact hole made in the interlayer insulating film 126. A second interlayer insulating film 128 is provided on the first wiring 127. A second wiring 129 is arranged through the contact hole made in the interlayer insulating films 126 and 128.

The IC chips 8 and 101 are manufactured as shown in FIG. 8 in such a manner that a plurality of IC chips are simultaneously formed in a semiconductor wafer 130 cut out from a single crystalline lump called "ingot" and each IC chip is separated from one another along scribing lines 131 indicated by dotted lines.

In order to make the ingot, a dedicated pot is required. The size of the semiconductor wafer cut out from the ingot has a certain limit. Therefore, the number of IC chips cut out from a sheet of semiconductor wafer 130 also has a limit. In addition, the semiconductor wafer having a large size is generally expensive. This is an obstacle to reduce the production cost.

Therefore, this invention intends to provide an IC chip capable of reducing the production cost.

Meanwhile, the IC chips 8 and 101 to be mounted on the LCD 100 are mounted on the body substrate 2 by pressure welding. In this case, the glass substrate and the semiconductor substrate have different coefficients of thermal expansion. Therefore, according to an environment to be adopted, a problem that the chip comes off may be presented. This leads to failure of the display device.

SUMMARY OF THE INVENTION

Accordingly, this invention intends to provide a display device with less failure.

This invention has been accomplished in order to solve the above problem. An integrated circuit (IC) chip according to the invention includes a plurality of circuit elements and wirings connecting them formed on an IC substrate, wherein the IC substrate is made of glass, and a part of the plurality of circuit elements is made from poly-Si formed by crystallizing amorphous Si.

Further, a display device according to the invention includes a display area with a plurality pixel electrodes provided on a body substrate of glass and a driving IC chip for supplying a video signal to the pixel electrodes formed on the body substrate, wherein the driving IC chip includes a plurality of elements formed on an IC substrate of glass.

Furthermore, an active matrix type display device according to the invention includes a body substrate of glass, a display area with a plurality of pixel electrodes formed on the body substrate, and a plurality of switching elements formed on the body substrate and connected to the pixel electrodes, wherein a plurality of driving IC chips connected to the switching elements are loaded on the body substrate, and at least a part of the driving IC chips includes a plurality of elements on an IC substrate of glass.

Moreover, an active matrix type display device according to the invention includes a first body substrate of glass, a display area with a plurality of pixel electrodes formed on the first body substrate, a plurality of switching elements connected to the pixel electrodes, a second body substrate of glass opposite to the first body substrate, liquid crystal sealed between a common electrode formed below the second body substrate and opposite to the plurality of pixel electrodes and the first body substrate, where in a plurality of driving IC chips connected to the switching elements are loaded on the first body substrate, and at least a part of the driving IC chips includes a plurality of elements on an IC substrate of glass.

Further, an active matrix type display device according to the invention includes a body substrate of glass, a display area with a plurality of pixel electrodes formed on the body substrate, a plurality of switching elements formed on the body substrate and connected to the pixel electrodes, gate lines formed on the body substrate and connected to the gates of the switching elements, and signal lines formed on the body substrate and connected to the pixel electrodes though the switching elements, wherein a gate line driving IC chip connected to the gate lines and a signal line driving IC chip connected to the signal lines are mounted, and at least one of the gate line driving IC and the signal line driving IC includes a plurality of elements formed on an IC substrate of glass.

Furthermore, an active matrix type display device according to the invention includes a body substrate of glass, a display area with a plurality of pixel electrodes formed on the body substrate, a plurality of switching elements formed on the body substrate and connected to the pixel electrodes, gate lines formed on the body substrate and connected to the gates of the switching elements, and signal lines formed on the body substrate and connected to the pixel electrodes though the switching elements, wherein a gate line driving IC chip connected to the gate lines and a signal line driving IC chip connected to the signal lines are mounted, the gate line driving IC includes a plurality of elements formed on an IC substrate of glass, and the signal line driving IC includes a plurality of elements formed on an IC substrate of single-Si.

Further, in the display device, the plurality of switching elements formed on the body substrate has an active layer of amorphous Si, and the plurality of elements formed on the IC substrate has an active layer of poly-Si.

Further, in the display device, the switching elements are thin film transistors.

Further, the gate line driving IC chip is arranged as a single unit along the one side of the display area, and the gate lines are extended substantially in parallel from the gate line driving IC chip to the display area.

DETAILED DESCRIPTION OF THE PREFERRED EMBODIMENT

Figure 1:
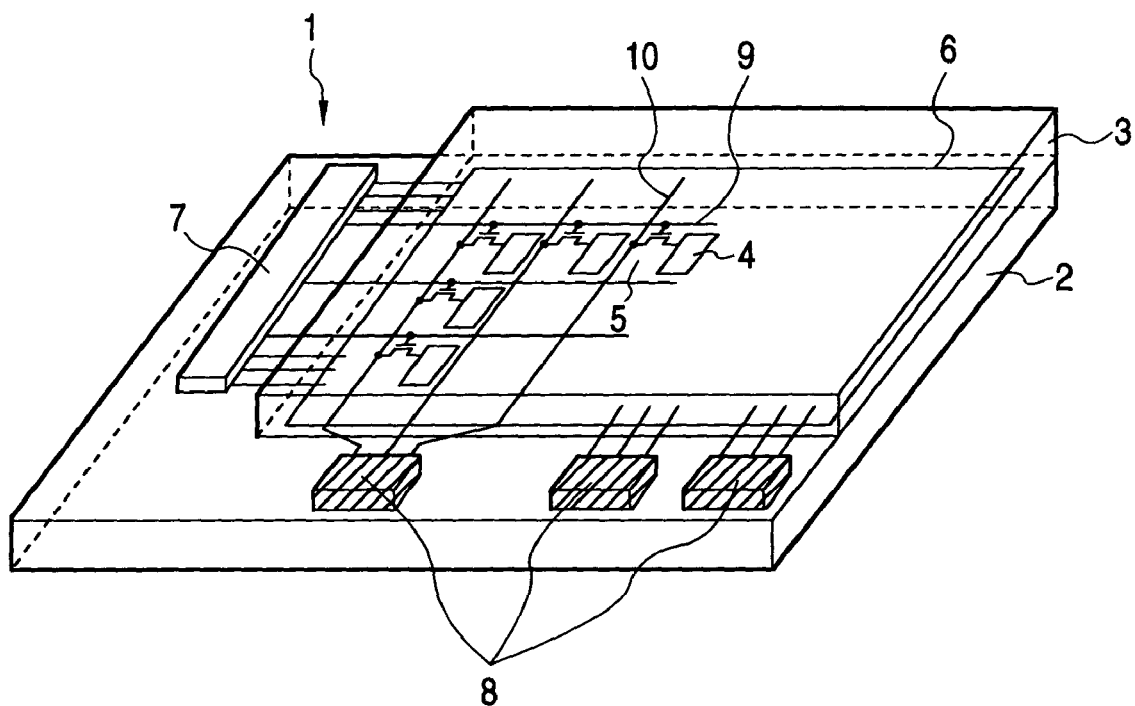
FIG. 1 is a perspective view of a display device on which IC chips according to this invention is mounted.

FIG. 1 is a perspective view showing a liquid crystal display (LCD) 1. The LCD 1 forms an display area by the liquid crystal sealed between a first body substrate 2 and a second body substrate 3 which are made of glass. On the first body substrate 2 in the display area, switching elements 5, which are formed of a plurality of pixel electrodes 4 and thin film transistors (TFT), are arranged in a matrix. Below the second body substrate on the entire surface of the display area, a common electrode 6 is provided. The LCD 1 is a display device in which a voltage is applied between the pixel electrodes 4 and the common electrode 6 to drive the liquid crystal for display. On the periphery of the display area, a single gate line driving IC 7 and a plurality of signal line driving ICs 8 are provided. A plurality of gate lines 9 for respective rows of the pixels are extended from the gate line driving IC 7. The gate line driving IC 7 sequentially selects the gate lines 9 to apply gate signals so that the TFTs 5 connected to the gate lines 9 are turned on. A plurality of signal lines 10 for respective columns of the pixels are extended from the signal line driving ICs 8. The signal line driving ICs 8 supply a video signal to the pixel electrodes 4 through the TFTs 5 which have been turned on. The gate line driving IC 7 and signal driving ICs 8 are IC chips mounted on the body substrate 2.

Figure 2:
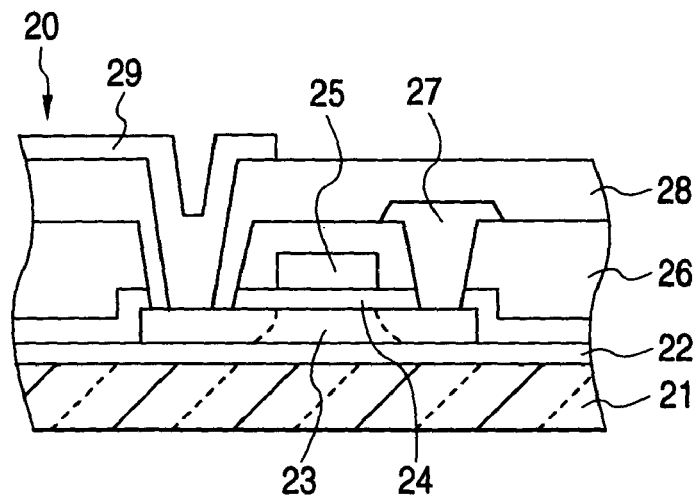
FIG. 2 is a sectional view of a MOS transistor formed on an IC substrate of glass.

The gate line driving IC 7 and signal line driving ICs 8 are ICs in which a plurality of elements and wirings are formed on a substrate. Generally, the IC chip is manufactured by stacking a semiconductor film, a conductive film, an insulating film, etc. stacked on an IC substrate of semiconductor. In this embodiment, a glass substrate is used for the gate line driving IC 7. FIG. 2 is a sectional view of a MOS transistor which is an example of the circuit element constituting the gate line driving IC 7 according to this embodiment. A buffer layer 22 for preventing impurity diffusion from an IC substrate 21 is formed on the IC substrate 21 made of no alkali glass not containing an alkaline element such as sodium. On the buffer layer 22, a poly-Si film 23 is provided as an active layer. A gate insulating layer 24 is formed to cover the poly-Si film 23. On the gate insulating film 24, a gate electrode 25 is provided to be superposed on a part of the poly-Si film 24. A first interlayer insulating film 26 is formed to cover the gate electrode 25. On the first interlayer insulating film 26, a first wiring 27 connected to the poly-Si film 23 is provided through a contact hole. A second interlayer insulating film 128 is provided to cover the first interlayer insulating film 27. On the second interlayer insulating film 28, a second wiring 29 connected to the poly-Si film 23 is provided through the contact hole made in the first and second interlayer insulating films 26 and 28.

Next, an explanation will be given of a method of forming a MOS transistor on the IC substrate 21. Since the softening temperature of glass is about 750° C., in this method, heat treatment at 750° C. or higher employed in a usual semiconductor process cannot be adopted. Therefore, stacking of layers can be basically carried out only by a technique of stacking materials such as sputtering, chemical vapor deposition (CVD), coating, etc. First, the buffer layer 22 is formed on the IC substrate 21 by CVD. Subsequently, an amorphous Si film is formed on the buffer layer 22. The amorphous Si film is irradiated with excimer laser so that it is locally heated and crystallized, thereby forming a poly-Si film 23. Patterning can be carried out by ordinary photolithography or etching. Further, the gate insulating film 24 is formed by CVD and the gate electrode 25 is formed by sputtering. The first interlayer insulating film is a laminate structure including a silicon oxide film and a silicon nitride film. The wirings 27 and 29 can be formed by sputtering. The second interlayer insulating film 28 can be formed by applying organic resin such as acryl.

Figure 3:
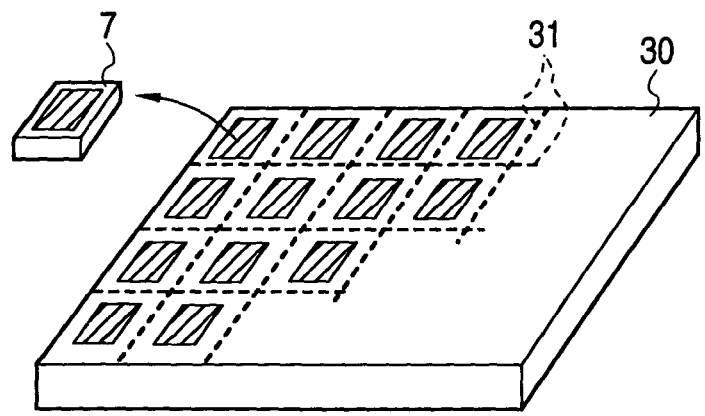
FIG. 3 is a perspective view of IC chips formed on a mother glass.

As seen from FIG. 3, the gate line driving ICs 7 each having the IC substrate of glass can be manufactured by simultaneously forming a plurality of ICs on a mother glass which is a large-format glass substrate, and separating it into segments along scribing lines 31 indicated by dotted lines. The glass substrate has a rectangular shape with one side of several tens centimeters and another side of several tens centimeters. Therefore, where the IC having the area equal to that of the ordinary gate line driving IC should be manufactured, the number of ICs which can be obtained can be increased several times from the case of the semiconductor wafer which has a circular shape with a diameter of 20 cm. This permits the production cost to be greatly reduced.

Figure 4:
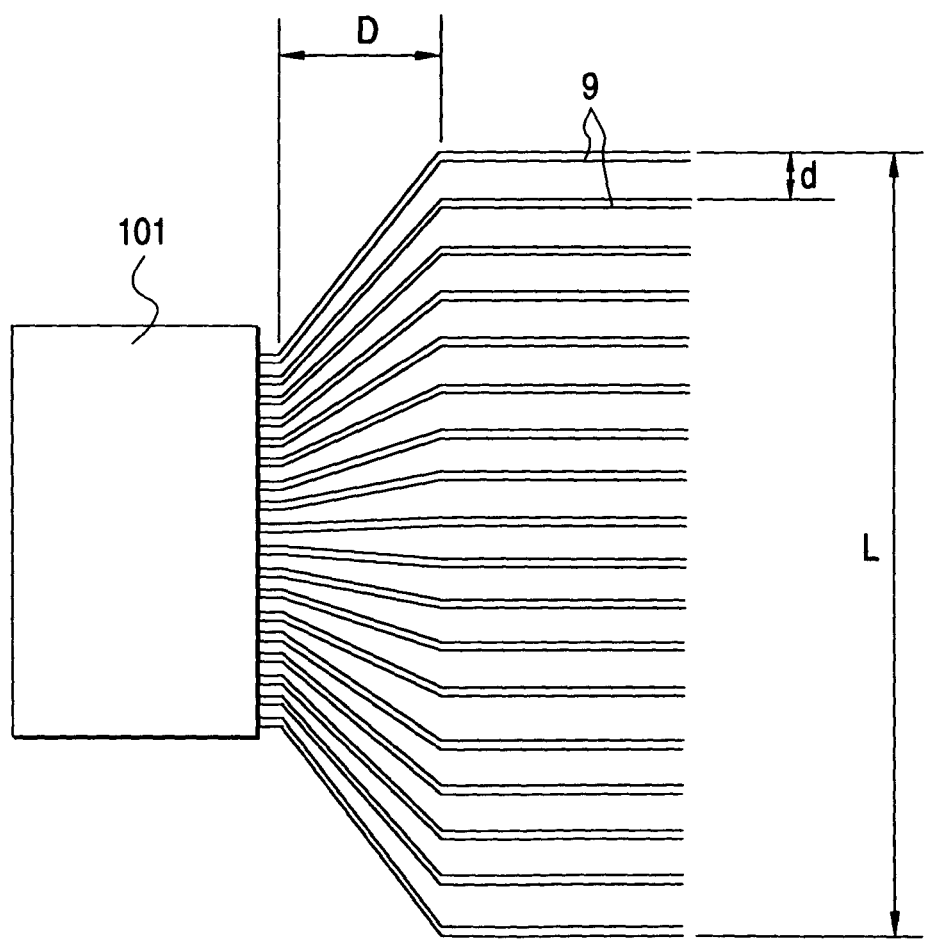
FIG. 4 is a plan view of a gate line driving IC and gate lines.

Further, by using the glass substrate, the length of the gate line driving IC 7 can be increased. As seen from FIG. 1, the gate line driving IC 7 according to this embodiment has a length approximately equal to that of the side of the display area. An advantage of increasing the gate line driving IC 7 will be explained below. FIG. 4 is an enlarged view of the gate line driving IC using an ordinary semiconductor substrate. The gate lines 9 are arranged along the respective rows of the pixels so that the outputs from the gate line driving IC must be enlarged to the pitch of the rows of the pixels. As the number of the pixels increases, that of the gate lines also increases. The width L to be enlarged further increases. However, the gate line just aside from the gate line driving IC and the gate line remote therefrom have different distances from the gate line drive IC 101 to the display area. Therefore, as the gate line becomes farther from the gate line driving IC, larger delay of the gate signal occurs. In order to obviate such an inconvenience, traditionally, the IC chips for the gate line driving ICs were arranged at regular intervals to limit the signal delay within an operable range. On the other hand, in this embodiment, since the gate line driving IC 7 has a length approximately equal to that of the display area, it is not necessary to increase the arrangement area of the gate lines. All the gate lines can be arranged substantially in parallel, and their distances to the display area can be made substantially equal. This provides equal circuit delays for the respective rows. Thus, it is not necessary to arrange the gate line driving IC 7 in a manner dispersed into a plurality of IC chips and is possible to employ the gate line driving IC 7 as a single unit. In addition, in order to enlarge the arrangement range of the gate lines extending from the gate line driving IC to a width L, a distance D was required. This embodiment can do without the distance D. This contributes to downsizing the display device and reducing the size of frame thereof.

It is needless to say that mounting the gate line driving IC as a single unit requires a smaller number of steps than mounting it as a plurality of IC chips.

Figure 8:
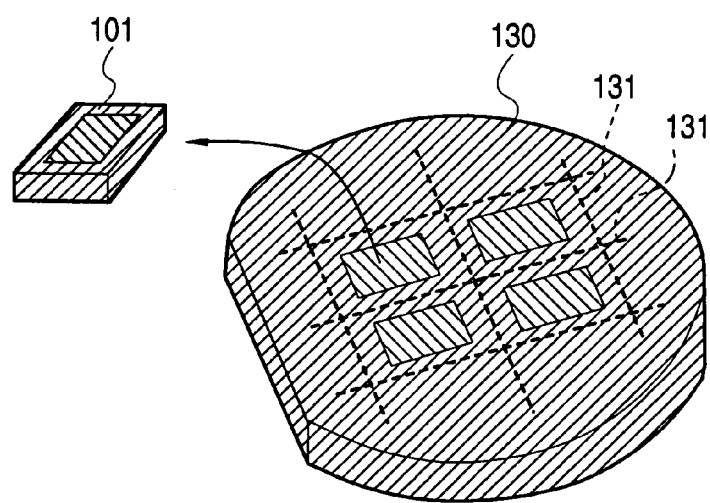
FIG. 8 is a perspective view of IC chips on a semiconductor wafer.

It is not so practical to manufacture such a lengthy IC chip from a semiconductor substrate. As described above, the semiconductor wafer is made by cutting the ingot of single-crystalline Si (single-Si). However, the ingot is made using a special pot so that is cannot have a size exceeding a certain size. In addition, as seen from FIG. 8, generally, the semiconductor wafer has a circular shape partially cut. For this reason, to make an excessively lengthy IC greatly reduces the number of ICs to be acquired from a single wafer, and hence is not effective. On the other hand, where the IC chips are made from the glass substrate, since the mother glass 30 is rectangular, to make the lengthy IC does not particularly reduce the efficiency. Meanwhile, TFTs are built in the body substrate 2 for LCD. Using the equipment for making the body substrate, the IC having a length equal to that of the body substrate can be manufactured using no additional capital investment.

Further, since the IC substrate of glass is mounted on the body substrate of glass, the body substrate 2 and gate line driving IC 7 have equal coefficients of thermal expansion. Therefore, there is little likelihood that the gate line driving IC 7 will peel off owing to the difference in the coefficient of thermal expansion. This reduces the occurrence of failures.

Meanwhile, as described above, where the IC substrate 21 of glass is employed, unlike the case of employing the IC substrate of Si, the gate insulating film cannot be formed by thermally oxidizing the substrate, and hence must be formed by CVD. However, the gate insulating film formed by CVD is not denser in the constituent molecules than that formed by the thermal oxidation. Therefore, with the same film thickness, the former cannot provide the insulation in the same degree as the latter. Hence, the gate insulating film 24 must be formed thicker. Further, the poly-Si film 23 has a plurality of crystalline regions which provide a large number of boundaries among the crystals, i.e. grain boundaries. Therefore, the active layer of the polycrystalline silicon (poly-Si) has a lower electron mobility than that of the active layer of the single-Si. As compared to the MOS-TETs formed on the semiconductor substrate, those formed on the glass substrate have poorer characteristic so that it is difficult to miniaturize ICs as compared with that on the semiconductor substrate. In view of these facts, in accordance with this embodiment, as before, the signal line driving ICs 8 employ IC chips of the semiconductor substrate. In the gate line driving IC 7, the shift register operates once during a horizontal synchronizing period, while in the signal line IC 8, supply of the video signal to the pixel electrodes corresponding to one row has to be finished during the horizontal synchronizing period so that the high speed operation is required. Further, the video signal supplied from the signal line driving IC is an analog voltage signal for implementation of multiple gradation. To this end, the signal line driving IC includes an analog element such as an operational amplifier. In order to arrange such a circuit at the pixel pitch, the IC using the semiconductor substrate is preferred to that using the glass substrate. For this reason, in accordance with this embodiment, the signal line driving ICs 8 use the IC substrate of the semiconductor having a higher electron mobility. In other words, the gate line driving IC uses the glass substrate since it operates at a lower speed. It is true that the signal line driving IC can be formed using the glass substrate. Therefore, placing emphasis on the merit that a large number of signal line driving ICs can be simultaneously manufactured from the mother glass 30, the signal line driving ICs may be manufactured from the glass substrate.

Figure 5:
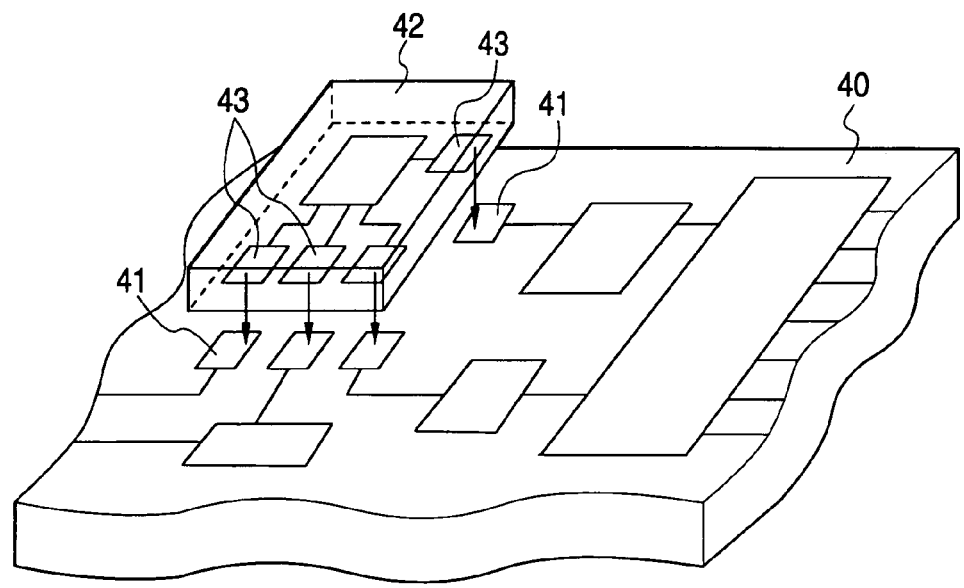
FIG. 5 is a perspective view for explaining the step of mounting IC chips according to this invention on a circuit substrate.
Figure 6:
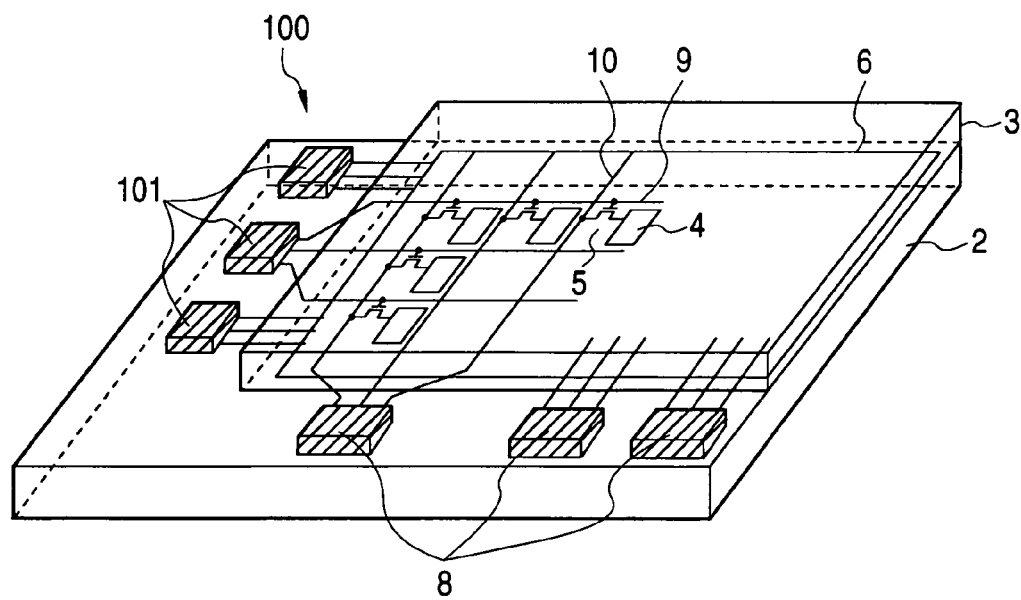
FIG. 6 is a perspective view of a display device on which ordinary IC chips are mounted.
Figure 7:
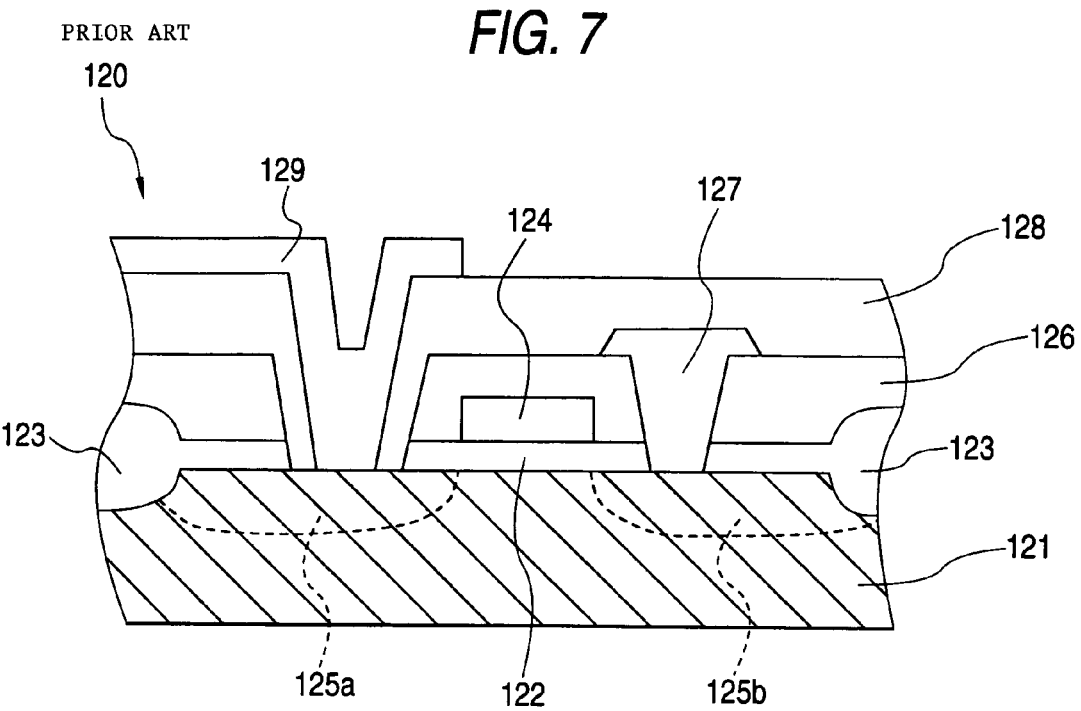
FIG. 7 is a sectional view of a MOS transistor formed on a semiconductor IC substrate.

A further merit of the IC chip using the glass substrate will be described below. FIG. 5 is a perspective view showing the manner of mounting the IC chip made from the glass substrate. As seen from FIG. 5, on a circuit board 40 which is a printed circuit board or a body substrate, substrate side terminals 41 used for mounting the IC chips as well as various elements and wirings are formed. The IC chip 42 to be mounted on the substrate side terminals 41 has various elements and wirings formed on the glass substrate, and is equipped with the chip side terminals 43 at the positions corresponding to the substrate side terminals 41. The bumps which are protrusions made of metal are formed on the substrate side terminals 43. The corresponding terminals are fixedly pressure welded on each other by resin adhesive containing minute conductive granules. In this case, if the corresponding terminals are deviated from each other, poor conduction will occur. In this embodiment, since the IC chip 42 is formed using the glass substrate, the terminals 41 on the circuit board 40 can be visually recognized through the IC chip 42. This facilitates easy accurate alignment and enhances the manufacturing efficiency.

In this embodiment, the active elements of the TFTs formed within the display area can be made of poly-Si, but may be made of amorphous Si. This is because the TFT provided as a switching element for each pixel has only to supply necessary charges to only the connected pixel once during a single vertical synchronizing period so that it is not required to have a greater current driving capability than a peripheral driving circuit. Therefore, after the amorphous semiconductor film has been formed in the body substrate 2, the step of poly-crystallizing by irradiation with the excimer laser can be omitted, thereby reducing the production cost.

The display device hitherto described was directed to an example of the active matrix type LCD using TFTs. However, this invention should not be limited to such an application. For example, the driving system may be passive, and the switching element may be a diode instead of the thin film transistor. Instead of the LCD, the display device may be an organic EL display device, a fluorescent display device, an LED display device, etc.

It is needless to say that the IC chip using the glass substrate can be applied to various circuits instead of the driving circuit for the display device.

As described hitherto in detail, this invention can provide an IC chip in which the circuit of poly-Si formed by crystallizing amorphous Si is provided on the IC substrate of glass so that it can be manufactured at lower cost than the substrate of a semiconductor wafer.

Further, by mounting the IC chip using the IC substrate of glass on the body substrate of glass, the coefficients of thermal expansion can be made equal between both substrates so that the peel-off of the chip due to a temperature change can be prevented.

The typical appliance using the glass as a body substrate is a display device using liquid crystal, EL, etc. The typical IC chips loaded thereon is a gate line driving IC, a signal line driving IC, etc.

An active matrix type display device according to the invention includes a body substrate of glass, a display area with a plurality of pixel electrodes formed on the body substrate and a plurality of switching elements connected to the pixel electrodes, wherein a plurality of driving IC chips connected to the switching elements are mounted on the body substrate, and at least a part of the driving IC chips includes a plurality of elements on an IC substrate of glass.

Particularly, the gate line driving IC chip is slower in an operation speed than the signal line driving IC chip, and does not incorporate the circuit element which performs an analog operation so that it can be preferably made from the glass substrate. On the other hand, as the case may be, the signal driving IC chips is preferably made from the semiconductor substrate.

Further, by making the active layer of amorphous Si on the body substrate and of the poly-Si on the IC substrate, the crystallizing step on the body substrate can be omitted, thereby reducing the production cost while keeping the necessary and sufficient element characteristic.

Furthermore, by making the gate line driving IC from the glass substrate, it can be arranged as a single unit along the one side of the display area so that the gate lines can be arranged substantially in parallel from the gate line driving IC chip toward the display area. Therefore, the signal delay can be equalized for each gate line, thus assuring the operation of the display device. In addition, as compared with the case where a plurality of gate line driving IC chips are provided, the mounting cost can be reduced.

What is claimed is:

1. A display device comprising:
   a body substrate made of glass;
   a display area with a plurality of pixel electrodes provided on the body substrate;
   a plurality of switching elements provided on the body substrate and connected to the pixel electrodes;
   gate lines formed on the body substrate and connected to gates of the switching elements;
   signal lines formed on the body substrate and connected to the pixel electrodes through the switching elements;
   a gate line driving IC chip connected to the gate lines; and
   a signal line driving IC chip connected to the signal lines;
   wherein an electron mobility of an element constituting the signal line driving IC chip is higher than an electron mobility of an element constituting the gate line driving IC chip for at least one of the gate lines.

2. The display device as claimed in claim 1 wherein a plurality of elements formed on the signal line driving IC chip include an active layer of polycrystalline silicon.

3. The display device as claimed in claim 2 wherein:
   the gate line driving IC chip is arranged along one side of the display area;
   the gate lines are extended substantially in parallel from the gate line driving integrated circuit chip to the display area;
   the plurality of signal line driving IC chips are arranged to extend parallel to the one side where the gate line driving IC chip is arranged; and
   wherein the signal lines are formed so as to spread from the signal line driving IC chips to the display area.

4. The display device as claimed in claim 2 wherein the plurality of elements formed on the body substrate include an active layer of polycrystalline silicon.

5. The display device as claimed in claim 1 wherein a plurality of elements formed on the gate line driving IC chip include an active layer of polycrystalline silicon.

6. The display device as claimed in claim 5 wherein the gate line IC chip is comprised of a plurality of elements on the body substrate and the gate line driving IC chip has a same thermal expansion as the body substrate.

7. The display device as claimed in claim 5 wherein a plurality of elements formed on the signal line driving IC chip include an active layer of polycrystalline silicon.

8. The display device as claimed in claim 7 wherein the plurality of elements formed on the body substrate include an active layer of polycrystalline silicon.

9. The display device as claimed in claim 7 wherein:
   the gate line driving IC chip is arranged along one side of the display area;
   the gate lines are extended substantially in parallel from the gate line driving integrated circuit chip to the display area;
   the plurality of signal line driving IC chips are arranged to extend parallel to the one side where the gate line driving IC chip is arranged; and
   wherein the signal lines are formed so as to spread from the signal line driving IC chips to the display area.

10. A display device comprising:
    a body substrate made of glass;
    a display area with a plurality of pixel electrodes provided on the body substrate;
    a plurality of switching elements provided on the body substrate and connected to the pixel electrodes;
    gate lines formed on the body substrate and connected to gates of the switching elements;
    signal lines formed on the body substrate and connected to the pixel electrodes through the switching elements;
    one gate line driving IC chip connected to the gate lines; and
    a plurality of signal line driving IC chips connected to the signal lines;
    wherein an electron mobility of an element constituting the signal line driving IC chips is higher than an electron mobility of an element constituting the gate line driving IC chip.

* * * * *